United States Patent [19]
Reid et al.

[11] 4,074,648
[45] Feb. 21, 1978

[54] ADAPTIVE AUTOPILOT FOR MARINE VESSELS

[75] Inventors: Robert E. Reid, Barboursville; Charles R. Wesner, Crozet, both of Va.

[73] Assignee: Sperry Rand Corporation, New York, N.Y.

[21] Appl. No.: 733,637

[22] Filed: Oct. 18, 1976

[51] Int. Cl.² ............................................. B63H 25/04
[52] U.S. Cl. .......................... 114/144 RE; 318/561; 318/588; 244/195; 364/435
[58] Field of Search ............. 73/178 R; 114/126, 144; 235/150.1, 150.2; 244/175, 179, 189, 195; 318/588, 591, 561

[56] References Cited

U.S. PATENT DOCUMENTS

| | | | |
|---|---|---|---|
| 3,446,946 | 5/1969 | Andeen | 235/150.1 |
| 3,604,907 | 9/1971 | Wesner | 114/144 RE |
| 3,656,043 | 4/1972 | Kawada et al. | 114/144 RE X |
| 3,676,648 | 7/1972 | Wesner | 114/144 RE X |
| 3,727,572 | 4/1973 | Nelson et al. | 114/126 |
| 3,741,474 | 6/1973 | Kawada et al. | 114/144 RE X |
| 3,919,961 | 11/1975 | McDougal | 114/144 RE |

OTHER PUBLICATIONS

J. E. Gaffney, Jr., et al., Adaptive Ship Steering Characteristic, IBM Technical Disclosure Bulletin, vol. 19, No. 5, Oct. 1976, p. 1572–1573.

*Primary Examiner*—Stephen G. Kunin
*Attorney, Agent, or Firm*—Howard P. Terry; Joseph M. Roehl

[57] ABSTRACT

An autopilot automatically adjusts the sensitivity of a ship's steering system to accommodate changes in speed as well as sea and wind conditions. The autopilot utilizes heading error, speed and speed squared signals to produce a rudder order signal for controlling rudder position. The rudder order signal is developed in a heading keeping circuit unless a heading change greater than a predetermined threshold is commanded, in which event a programmer substitutes a heading change circuit for the heading keeping circuit. The sensitivity of the heading change circuit is automatically adjusted as an inverse function of vessel speed squared, and automatic rudder order limits are established in the same circuit as an inverse function of speed. The sensitivity of the heading keeping circuit is adjusted in accordance with a signal from an automatic gain control circuit which derives a performance index J from ship's speed, heading error and rudder order signals occurring during a given measurement interval. The performance index derived during a given measurement interval is compared with the index derived in the previous interval and a counter register is set according to the results of this comparison. The heading keeping circuit receives heading error signals which are processed in a first proportional channel and also differentiated and processed in a second or rate channel. The attenuation in each channel is adjusted in accordance with the value stored in the counter register. The attenuation in the rate channel is made equal to the square root of the attenuation in the proportional channel. The modified rate and proportional signals are added to obtain the final rudder order signal.

10 Claims, 6 Drawing Figures

ADAPTIVE AUTOPILOT FOR MARINE VESSELS

BACKGROUND OF THE INVENTION

1. Field of the Invention

The present invention relates to steering systems for marine vessels and, more particularly, to automatic steering systems for such vessels.

2. Description of the Prior Art known in the art. Such systems comprise means for setting a desired course. The actual heading of the vessel is constantly compared with the desired heading so as to develop a finite heading error signal whenever the vessel deviates from the desired course. The heading error signal is used to correct the rudder position so as to bring the vessel back to the desired heading.

In order to operate in an efficient and practical manner, present day autopilots include manual controls to optimize performance for varying wind and sea conditions as well as changing ship speeds. However, with such manual adjustment, the operator is frequently unable to realize optimum conditions since the time constants on a large vessel are fairly long. With such vessels, it may be necessary to run for periods of ten minutes or so before the operator can determine the effect of a manual adjustment. The adjustments therefore become a matter of trial and error with a consequent loss in operating efficiency and increase in fuel consumption.

The circuit of the present invention utilizes sensors which detect slight changes in heading error, rudder angle and speed which would be too small to be detected by an operator and uses these signals to compute the optimum gain and amount of rudder offset.

SUMMARY OF THE INVENTION

Electrical signals representative of instantaneous values of heading error, rudder order and speed are combined to derive a performance index figure whereupon the circuits are adjusted to provide a rudder order signal which minimizes the value of the performance index so as to optimize operating efficiency.

DESCRIPTION OF THE PREFERRED EMBODIMENT

The operating efficiency of a marine vessel depends to a large extent on the propulsion losses experienced during normal operation, therefore it becomes highly desirable to reduce the total drag or resistance to forward motion of the ship. The total drag on a ship may be considered to be equal to the sum of the drag on the hull and the rudder drag. However, since the drag on the hull is determined by the ship's design and loading conditions, only the rudder motion can be controlled in order to minimize drag.

Under given operating conditions, increased yaw serves to increase the drag experienced by the ship, but increasing the rudder angle in an effort to reduce yaw also increases the drag. Therefore, optimum efficiency requires a balance between the rudder angle and yaw.

The problem is further complicated by the fact that optimum balance between rudder angle and yaw varies with wind and sea conditions, speed, and the angle of attack of the vessel with respect to the waves.

Various investigators have attacked the problem of reducing the propulsion losses by postulating a performance criterion depending upon the sum of the square of the heading error and a factor indicative of the square of the rudder order signal. However, the use of this performance criterion provides only a partial solution in that it neglects the effect of the vessel's speed.

As will be explained, the present invention operates in a manner to minimize the value of the performance index, J, in accordance with the following formula:

$$J = \frac{\lambda}{U^2} (\overline{\psi_e^2}) + \overline{\delta_o^2}$$

where $\lambda$ is a proportionality constant dependent upon the ship's design and loading, $U^2$ is proportional to the square of the ship's speed, $\overline{\psi_e}^2$ is the average of the square of the heading errors measured during a given interval, and $\overline{\delta_o}^2$ is a measure of the square of the rudder order signals measured over the same time interval.

The application and implementation of this formula will be explained in detail.

The performance of a ship controlled by an automatic pilot is frequently described by means of a Bode plot (FIG. 1) wherein the amplitude of the yaw variations experienced by the ship as measured in db is plotted against the frequency of the forcing function which moves the rudder. The usefulness of the Bode plot in depicting the operation of a ship under these conditions is dependent upon the fact that the stability of an autopilot in steering a ship is analogous to the stability problem of a servo loop when the gain of the servo loop is greater than unity (0 db), in that the servo loop tends to oscillate if the phase lag is such as to produce a frequency response with a slope of $-2$.

Figure 1:
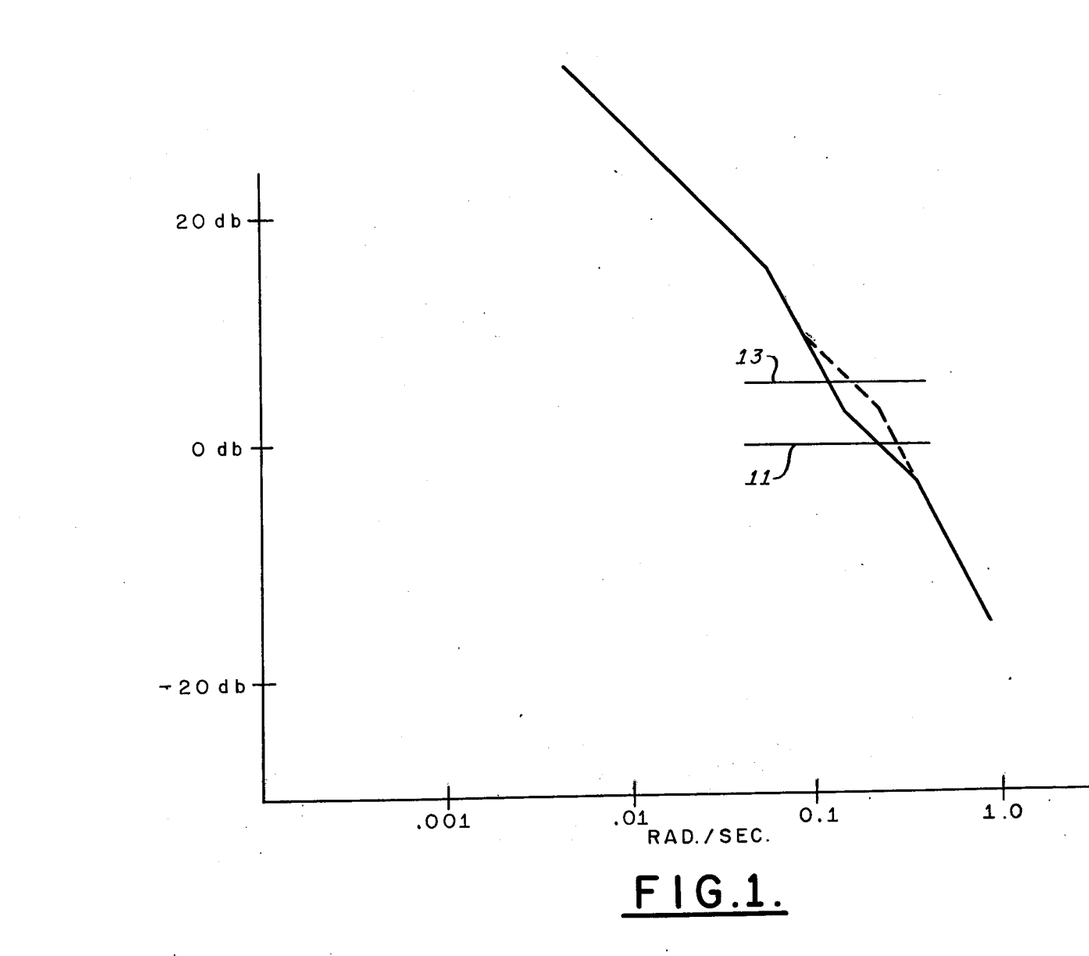
FIG. 1 is a graph useful in explaining the invention.

In accordance with known principles, it is known that if the characteristic curve in the Bode plot passes through the 0 db line at a slope of $-2$, the system is unstable and that rate signals representative of the rate of change of heading error can be added to the automatic pilot input to restore stability to the system. This effectively reduces the slope of the characteristic curve to $-1$ at the 0 db point.

It will also be noted that the higher frequency portion of the characteristic curve depicted as a solid line in FIG. 1 reverts to a slope of $-2$ as a result of rate filters customarily added to an automatic pilot system in order to reduce rudder motion and therefore minimize drag.

In accordance with the principles of the present invention, a frequency band over which the rate signal is effective is minimized so as to minimize drag. In accordance with the principles of the present invention, an automatic gain control (AGC) is used to adjust the gain in the channels carrying the proportional and rate heading error signals. The gain change in the proportional channel shifts the 0 db line 11 upward to a position 13 so that this 0 db line intersects the solid line characteristic curve in a region where the slope of the characteristic is −2.

Further, in accordance with the principles of the present invention, the rate signal is subjected to an attenuation which is equal to the square root of the attenuation of the proportional channel so that the −1 slope of the characteristic curve is shifted upward in equal amount as indicated in the dashed portion of the curve of FIG. 1.

Therefore, in accordance with the principles of the present invention, a minimum amount of rate signal necessary for stability is maintained at the new gain level.

Figure 2:
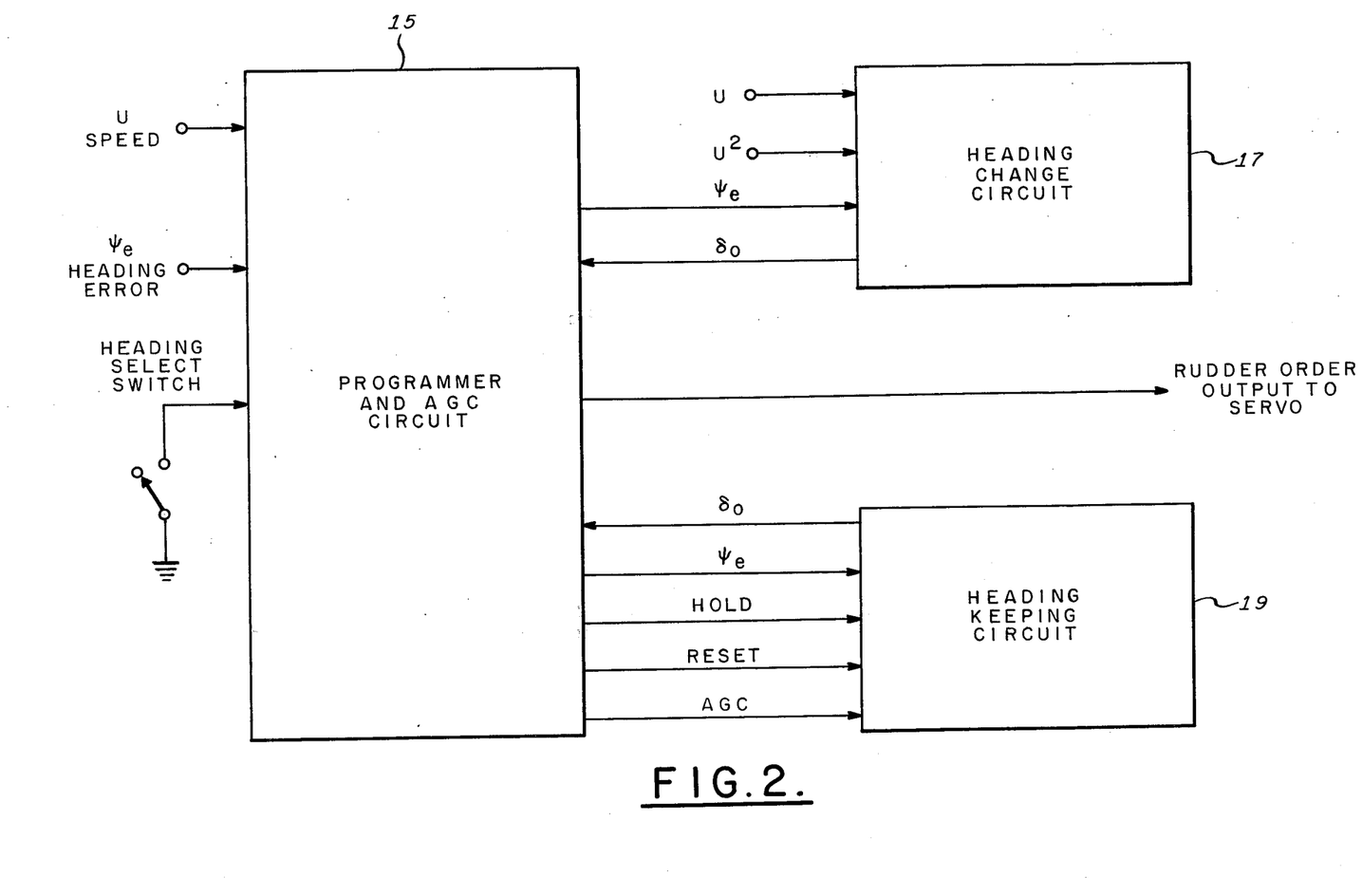
FIG. 2 is a block diagram illustrating the major components in a circuit utilizing the principles of the invention.

The major segments of a circuit constructed in accordance with the principles of the present invention are depicted in FIG. 2 wherein a programmer and AGC circuit 15 operates in conjunction with a heading change (HC) circuit 17 and a heading keeping (HK) circuit 19. The programmer and AGC circuit receives signals indicative of the ship's speed and heading error and selects the HC circuit whenever a heading change greater than a selected threshold (typically 3 degrees) is ordered. The programmer also disables a heading error alarm circuit and holds the contents of an integrator in the HK circuit and a register in the AGC circuit under these conditions. If the heading change ordered exceeds second threshold (typically 15 degrees), the integrator and register are reset to an initial state. When the HC circuit brings the ship within the lower threshold, a timer is activated which causes automatic transfer to the HK circuit if the heading error remains below the lower threshold for a time interval.

The AGC portion of the circuit 15 implements the above-mentioned J formula, compares the current value of J with the previously measured value of J and produces an AGC signal to regulate the HK gain accordingly.

Figure 3A:
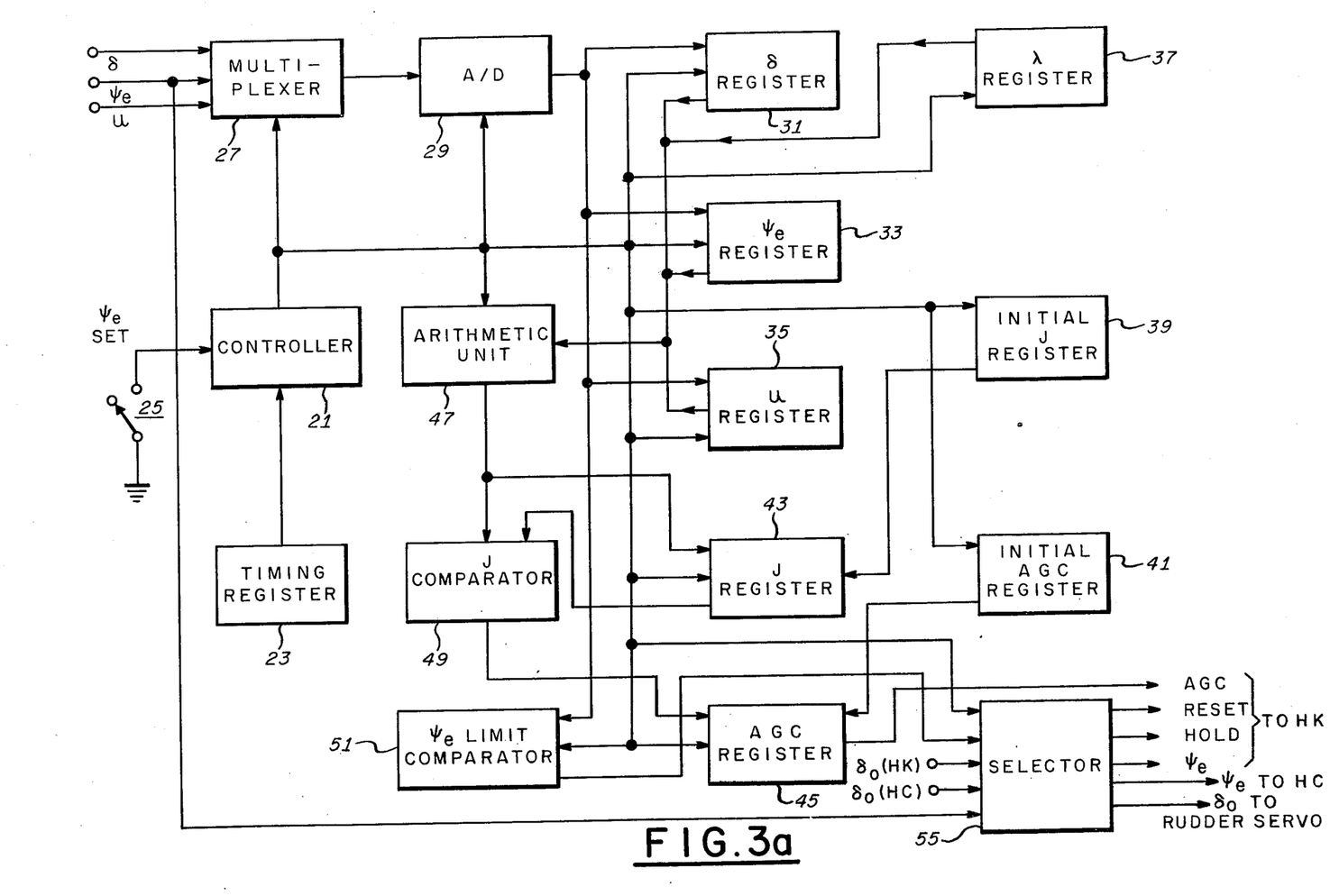
FIG. 3a is a block diagram illustrating the components in the programmer and AGC circuit of FIG. 2.

The construction and operation of the programmmer and AGC circuit of FIG. 2 can be understood by referring to the block diagram of FIG. 3a. The components in the circuit of FIG. 3a are controlled by timing signals derived from the controller 21. The controller itself, may be adjusted in accordance with signals received from a timing register 23 which is used to store information pertaining to ship's loading desired measurement intervals, and other parameters. A manually operated switch 25 is closed when a deliberate course change is to be made as will be explained.

A conventional multiplexer 27 sequentially samples rudder order signals derived from the currently operative or HK circuit, heading error signals and speed signals. All signals applied to the multiplexer are in analog form so that the output of the multiplexer consists of sequences of three analog signals occurring at a rate and intervals dependent upon timing signals from the controller 21. In its simplest form, the multiplexer could consist of a sequential switch, although commercially available multiplexers in the form of integrated circuits are presently preferred.

The signals from the multiplexer 27 are converted into digital form in an analog-to-digital converter 29 in response to timing signals from the controller 21 and stored in appropriate registers 31, 33 and 35. These three registers are also under control of the same timing pulse from the controller 21. Thus, after the appropriate pulse from the controller 21, binary information indicative of the current value of the rudder order signal, the heading error signal, and the ship's speed are stored in the registers 31, 33 and 35.

Prior to operation of the automatic pilot, binary information representative of the ship's characteristics and loading is read into the register 37. Similarly, binary information representing a nominal value of J and AGC is read into the registers 39 and 41 respectively. At the start of a given run, information stored in the registers 39 and 41 is read into the registers 43 and 45 respectively in order to establish a nominal operating level.

Figure 3B:
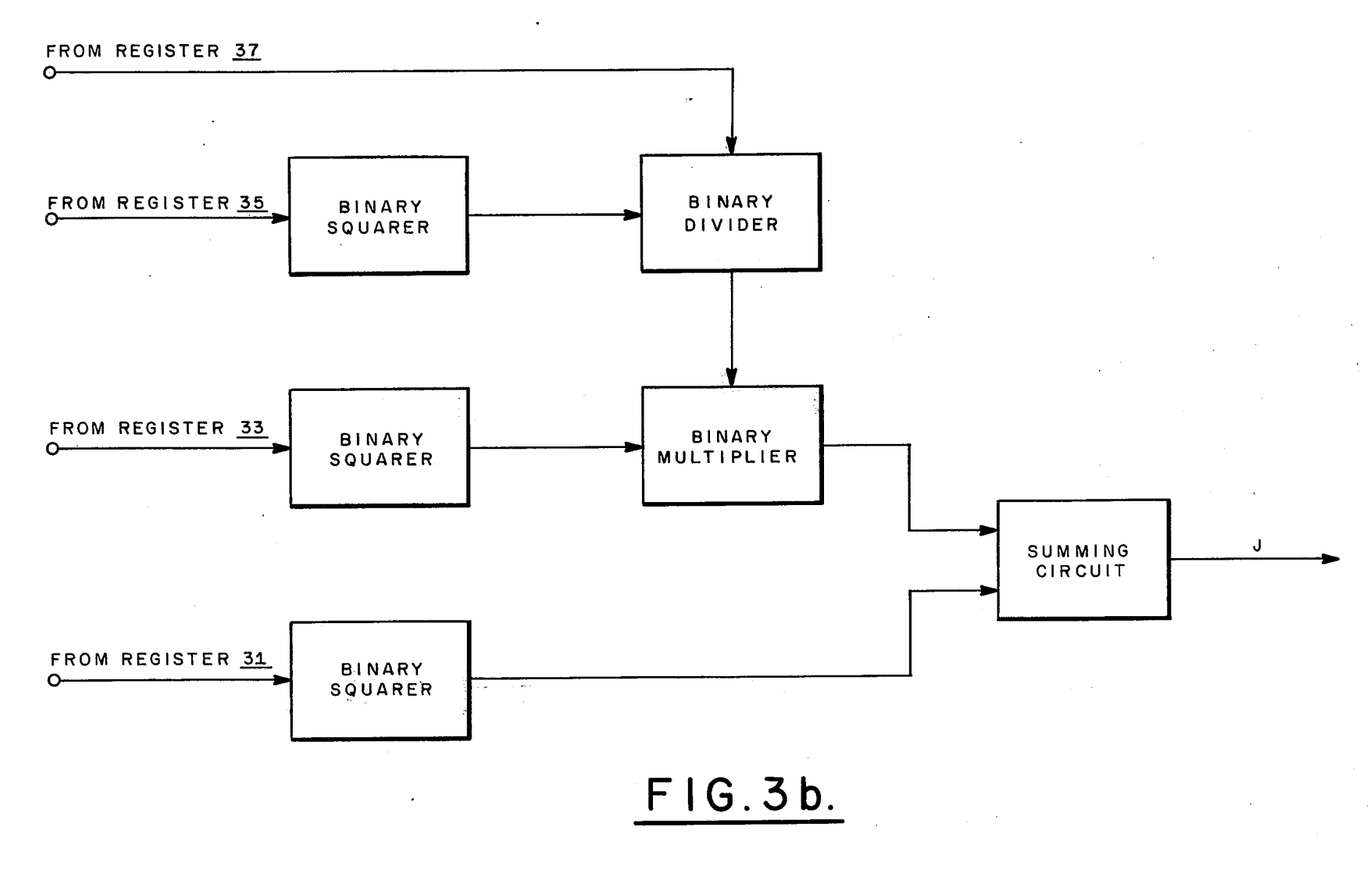
FIG. 3b is a block diagram illustrating the components in the arithmetic unit of FIG. 3a, FIG. 4 is a block diagram illustrating the components in the heading keeping circuit of FIG. 2.

The performance index J is calculated in an arithmetic unit 47 which consists of a straight forward combination of conventional components for performing the necessary mathematical operations in response to a timing signal from the controller 21. Basically as shown in FIG. 3b, the arithmetic unit 47 consists of a combination of conventional circuits for performing the following functions:

(1) A binary squarer for squaring the value of U read out of the register 35,
(2) a binary divider for dividing the value from step 1 into the value of λ read out of the register 37,
(3) a binary squarer for squaring the value of $\psi_e$ from the register 33,
(4) a binary multiplier for multiplying the results obtained from steps 2 and 3,
(5) a binary squarer for squaring the value of δ read out of the register 31, and
(6) a summing circuit for adding the results obtained in steps 4 and 5.

Ordinarily, it is desirable to use values of $\cap_e^2$ and $\delta^2$ averaged over a specified time interval in order to obtain more reliable results. This can be achieved by applying the output of the corresponding binary squarers in the arithmetic unit to conventional registers, accumulating the data from steps (1) and (3) for the desired number of measurement intervals and dividing the values stored in these registers by the number of measurement cycles selected.

In a typical circuit, the timing register 23 may be set to switch the controller 21 to a mode in which data in the registers 31 and 33 are read into the arithmetic unit for several minutes before a timing signal from the controller is applied to the arithmetic unit commanding this unit to calculate J.

The value of J is applied to a J comparator 49 along with the value of J previously stored in the register 43. Thus in the first measurement made in a given run, the value of J applied to the comparator 49 will be compared with the value of J initially read into the register 43 from the initial J register 39. During subsequent measurements, the value of J from the arithmetic unit 47 is applied to both the comparator 49 and the register 43. At the same time, the information stored in the register 43 during the previous measurement is read into the J comparator so that this component always compares the value of J obtained during the current measurement with that obtained during the previous measurement. The results of this comparison are applied to the AGC register 45. The register 45 may, for instance, be an up/down counter or equivalent, connected so that a signal from the comparator 49 indicating that the value of J has decreased, increments the register 45 one step in the same direction as the previous change. If J has increased or not changed, the register 45 is incremented one step in the opposite direction. In effect, this provides a hunting type controller which constantly seeks a minimum value for J. The output of the AGC register 45 is applied to the HK circuit as indicated in FIG. 3a.

The circuit of FIG. 3a also includes the programmer included in block 15 of FIG. 2.

A heading limit comparator 51 receives binary coded heading error signals from the analog-to-digital converter 29 in response to a timing pulse from the controller 21. The results of the comparison in the circuit 51 are applied to a selector circuit 55. The selector circuit 55 is basically a switching device to apply appropriate signals to either the HK circuit or the HC circuit in accordance with the magnitude of the heading error signal. The selector circuit 55 receives rudder order signals being produced by the HK and HC circuits and the analog signal representing heading error from the input of the multiplexer 27. When the comparator 51 detects a heading error within a first threshold (such as 3°), the selector circuit switches the analog heading error signal to the HK circuit and switches the rudder order from the HK circuit to the rudder servo which controls the position of the rudder. When the comparator 51 detects a heading error greater than the aforementioned lower threshold, and the Heading Select Switch is closed, the selector circuit 55 provides a hold signal to the HK circuit which maintains the contents of an integrator in the HK circuit and the contents of the AGC register. Under these conditions, the analog heading error signal is switched to the HC circuit and the rudder order signal from the HC circuit is applied to the rudder servo.

The selector circuit 55 maintains the HC circuit in operation until the heading error signal again falls below the aforementioned lower threshold.

If the limit comparator 51 detects a heading error in excess of a second threshold, such as 15°, the selector circuit 55 not only switches the operation to the HC circuit but also provides a reset signal which resets the integrator in the HK circuit and the AGC register to a new initial state.

It will be appreciated that although FIG. 3a might imply that discrete components are used for the programmer and AGC circuit, a microcomputer may be programmed to perform the various functions in accordance with well known techniques.

Figure 4:
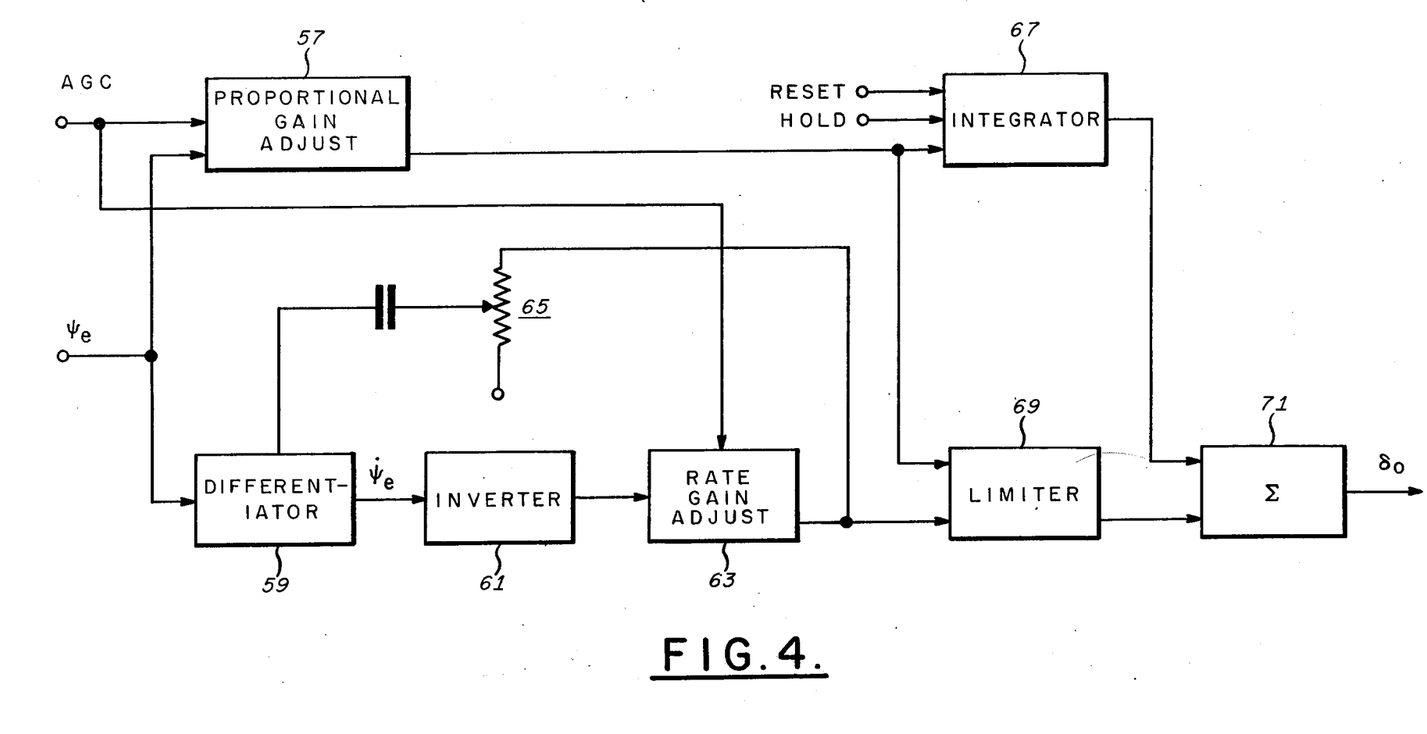

The heading keeping circuit (HK) 19 of FIG. 2 is shown in more detail in FIG. 4.

The analog heading error signal is applied to the circuit of FIG. 4 when the selector 55 determines that the HK circuit is to provide the rudder order signal to the rudder servo. The binary AGC signal from the register 45 (FIG. 3a) is applied to the HK circuit at all times. Finally, reset and hold signals are also applied to the HK circuit from the selector 55 as previously discussed.

The HK circuit includes differentiating, integrating and summing means arranged so that the rudder order signal produced by the HK circuit represents a combination of a proportional heading error signal, a heading error rate signal, and an integrated heading error signal. The advantages of combining such signals is known in the prior art and is discussed, for instance, in U.S. Pat. No. 3,604,907 issued to Charles R. Wesner and assigned to the present assignee.

Referring more specifically to FIG. 4, the heading error signal $\psi_e$ is applied to a proportional gain adjust circuit 57 and a differentiator 59 which produces a rate signal $\dot\psi_e$. The rate signal is inverted in an inverter 61 and applied to a rate gain adjust circuit 63.

It will be remembered that the AGC signal was derived in accordance with the novel formula for J. The proportional gain adjust circuit 57 and the rate gain adjust circuit 63 utilize this AGC signal in a unique way in order to achieve the mode of operation discussed with respect to the Bode plot of FIG. 1. The proportional gain adjust circuit 57 and the rate gain adjust circuit 63 each consist essentially of amplifying means and binary signal actuated attenuating means. In effect, the amplifying means in these circuits increase the 0 db level as depicted in FIG. 1 and the attenuating means alter the characteristic curve as indicated by the dashed line in FIG. 1. The attenuators in the circuits 57 and 63 may conveniently comprise commercially available components such as Analog Devices, Incorporated catalog number AD 7530. In accordance with known techniques for connecting such devices, the binary AGC signal is applied to the attenuator in the proportional gain adjust circuit 57 so that the over-all gain of the circuit 57 is directly proportional to the AGC signal. Furthermore, in accordance with known techniques for connecting such devices, the attenuator in the rate gain adjust circuit 63 is connected so that the over-all gain in this circuit is proportional to the square root of the AGC signal.

In additiona, a rate filter 65 is applied from the output of the rate gain adjust circuit 63 to the differentiator 59 to maintain a constant rate signal bandwidth with varying attenuation, but shifted in frequency. The function of the rate filter was discussed with respect to the Bode plot in FIG. 1.

The output of the proportional gain adjust circuit 57 is applied to a conventional integrator circuit 67 which is controlled by reset and hold signals as previously discussed. The output of the proportional gain adjust circuit is also applied to a limiter 69 along with the output signal of the rate gain adjust circuit 63. The limiter 69 is a conventional device providing linear gain for all signals within a specified amplitude range.

Since the integrator 67 operates on heading error signals which are passed through the proportional gain adjustment circuit 57, the integrator gain is automatically adjusted in accordance with changes in sensitivity.

Finally, the output signals from the integrator and the limiter are combined in a summing circuit 71 to produce an output rudder order command signal $\psi_o$ which is applied to the selector 55 as depicted in FIG. 3a.

Figure 5:
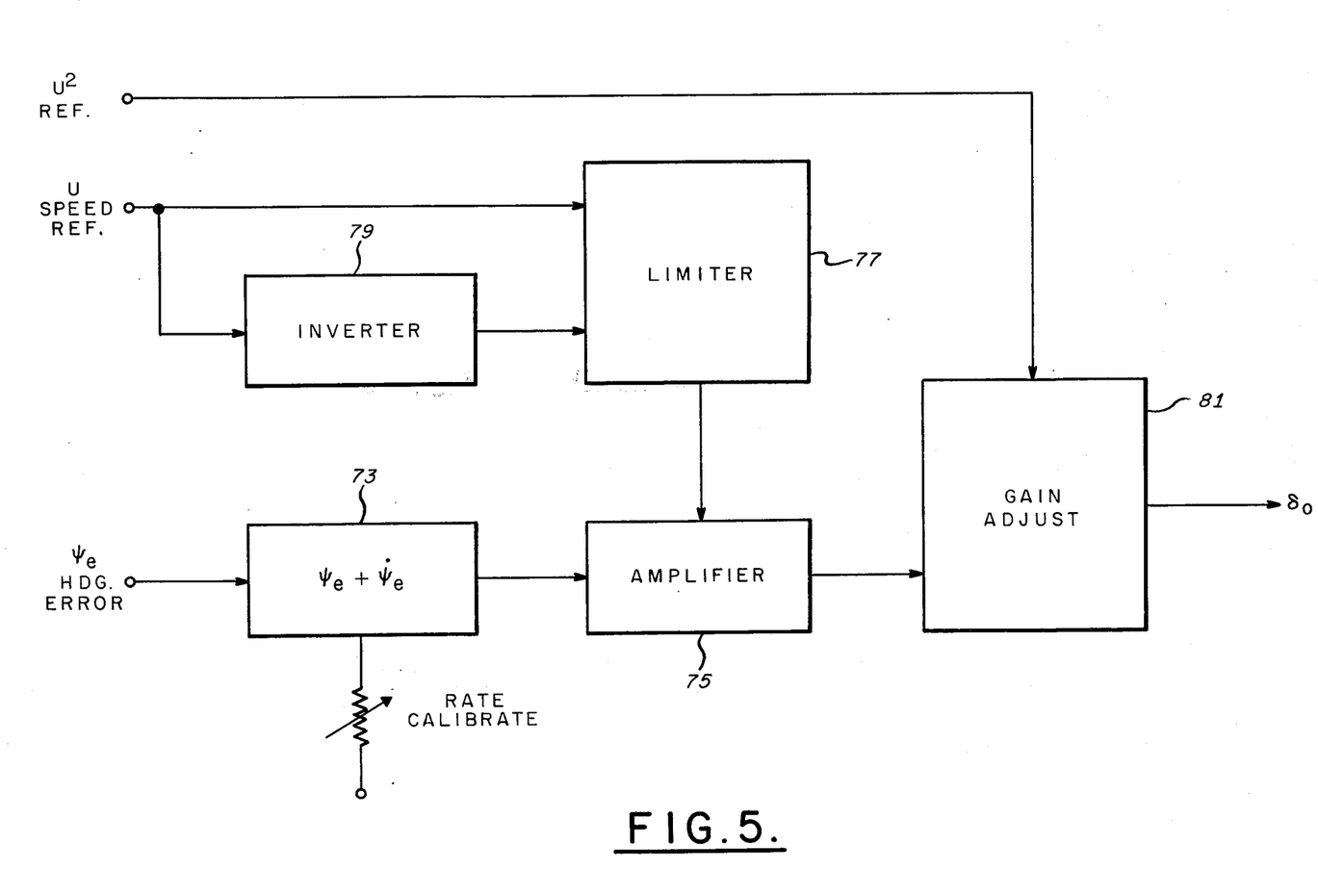
FIG. 5 is a block diagram illustrating the components in the heading change circuit of FIG. 2.

The heading change (HC) circuit 17 of FIG. 2 is shown in more detail in FIG. 5. When the selector circuit 55 (FIG. 3a) switches operation to the HC circuit, the analog heading error signal is applied to a straightforward differentiating and summing circuit wherein the heading error signal is differentiated, combined with the proportional heading error signal, and applied to a variable gain amplifier 75. The differentiated signal is combined with the proportional signal so as to effectively provide an anticipatory function and thus prevent "overshoot" in accordance with well known principles. Typically, this circuit includes a rate calibrate means for adjusting the R-C constant of the differentiator in order to maximize its effectiveness in accordance with ship characteristics and loading.

An analog signal representative of the ship's speed which may be obtained, for instance, from a tachometer driven by the propeller shaft of the ship, is applied directly to a limiter 77 and through an inverter 79 to the same limiter. The limiter is a straightforward circuit which adjusts the gain of the amplifier 75 as an inverse function of the speed. It will be appreciated that in accordance with conventional practice, the heading error signal consists of a d.c. signal having a magnitude indicative of the magnitude of the heading error and a polarity indicative of the sense of the heading error. Thus, in order to set positive and negative limits representing port and starboard heading errors, the limiter is supplied with direct and inverted feed reference signals as indicated in FIG. 5.

The use and structure of such limiters of this general type are known in the art. U.S. Pat. No. 3,676,648 issued to Charles R. Wesner and assigned to the present assignee, for instance, discloses the use of similar limiters in which the limiter functions to restrict the turning rate of a vessel as a function of the reciprocal of a speed squared.

In the circuit of the present invention, however, the maximum gain of the amplifier 75 is limited as a function of the reciprocal of the speed. It is known that rudder torque varies as a function of the reciprocal of speed squared, therefore limiting the rudder motion as a function of the reciprocal of speed provides an approximately constant maximum turning rate regardless of the speed of the vessel.

The output of the amplifier 75 is applied to a gain adjust circuit 81 in which the amplitude of the rudder order signal is adjusted as a function of the reciprocal of the speed squared.

The steering system of a ship may be regarded as a servo loop in which the rudder is part of that loop. In this context, the rudder is considered to provide a gain which decreases as the speed of the ship decreases. Therefore, in order to provide a constant gain in such a system, more rudder angle is required in order to provide a constant over-all loop gain as the ship slows down. By thus providing a rudder order signal $\delta_o$ whose magnitude is a function of the reciprocal of the ship's speed squared, a constant loop gain is provided throughout the normal speed range.

In brief, the heading change circuit of FIG. 5 is conventional except that it provides automatic sensitivity which is an inverse function of speed squared and automatic rudder order limits which are an inverse function of speed.

The heading error set switch 25 is manually closed when a deliberate course change is to be made. The switch operates through the controller 21, the heading error comparator 51, and the selector circuit 55 to transfer operation to the HC circuit only when deliberate heading changes are made and the heading change is greater than the previously described lower threshold limit.

By setting autopilot proportional and rate gains as a function of J, the circuit of the present invention serves to minimize propulsion losses rather than merely to minimize heading errors. By including speed in the computation of J, the propulsion losses are minimized over the range of operating speeds.

While the invention has been described in its preferred embodiment, it is to be understood that the words which have been used are words of description rather than limitation and that changes within the purview of the appended claims may be made without departing from the true scope and spirit of the invention in its broader aspects.

We claim:

1. An adaptive autopilot for ships comprising means to receive signals indicative of the ship's speed and heading error, heading keeping means for producing a rudder error signal indicative of desired rudder position when the error signal is below a selected threshold, heading change means for producing a rudder order signal when the error signal exceeds said threshold, means for selecting either the heading keeping or heading change means in accordance with the magnitude of the error signal, means for automatically adjusting the magnitude of the rudder order signal produced by the heading change means in accordance with changes in the ship's speed, and means for automatically adjusting the magnitude of the rudder order signal produced by the heading keeping means in accordance with changes in ship's speed heading error signal and rudder order signal.

2. The adaptive autopilot of claim 1 further including means for producing signals indicative of the value of the square of ship's speed, heading error and rudder order, respectively, said heading keeping means including means for automatically adjusting the magnitude of the rudder order signal in accordance with changes in the square of ship's speed, heading error and rudder order signals.

3. The adaptive autopilot of claim 2 wherein the heading change means includes means for automatically adjusting the magnitude of the rudder order signal in accordance with changes in signals representing ship's speed, and ship's speed squared.

4. The adaptive autopilot of claim 1 wherein the means for automatically adjusting the magnitude of the rudder order signal produced by the heading keeping means in accordance with changes in ship's speed includes means for producing an automatic gain control signal which is a function of ship's speed, and wherein said heading keeping means includes means for receiving said heading error and automatic gain control signals, means for differentiating said heading error signal, means for attenuating the heading error and differentiated signals as a function of the value of said automatic gain control signal, said attenuating means being adjusted so that the attenuation of the differentiated signal is equal to the square root of the attenuation of the heading error signal, means for integrating the attenuated heading error signal, and means for combining the attenuated heading error and differentiated signals with the integrated signal.

5. The adaptive autopilot of claim 1 wherein the means for automatically adjusting the magnitude of the rudder order signal produced by the heading keeping means includes means for sampling the rudder order, heading error, and speed signals during a designated measuring interval, means for squaring the value of each of said sampled signals, means for modifying the value of the squared heading error signal in accordance with the value of the speed signal squared, means for adding the modified value of the squared heading error signal to the value of squared rudder order signal to obtain an index indicative of the ship's performance, comparator means for comparing the index so obtained with the index obtained in the previous measuring interval, AGC register means, means to preset said AGC register means to a nominal value, means to adjust the value stored in said AGC register means in accordance with changing values of index detected by said comparator means, said adjustment means in the heading keeping means including attenuating means actuated in response to the value stored in said AGC register means.

6. The adaptive autopilot of claim 5 wherein the means for modifying the squared heading error signal includes means for multiplying the value of the squared heading error signal by an arbitrary constant and dividing the result of such multiplication by the value of the squared speed signal.

7. The adaptive autopilot of claim 6 wherein the AGC register means is a binary register and the means to adjust the values stored in the AGC register means operates to increment the AGC register means one step in a first direction when the comparator detects a decreased value of the index and to increment the AGC register means one step in the opposite direction when the comparator detects an increase in the index.

8. The adaptive autopilot of claim 7 wherein the heading keeping means includes proportional gain adjust means and differentiating means, each coupled to receive a heading error signal, said proportional gain adjust means being coupled to receive signals from the AGC register means indicative of the value of the information stored therein, said proportional gain adjust means containing binary attenuating means adjusted to provide an over-all gain proportional to the value stored in the said AGC register means, said differentiating means being coupled to a rate gain adjust means, said rate gain adjust means including binary attenuating means adjusted to provide an over-all gain proportional to the square root of the values stored in said AGC register means, limiting means coupled to receive the output signals from said proportional gain and rate gain adjust means, said limiting means being adjusted to pass signals having magnitudes only within the limits established by the magnitude of the output signal from said proportional gain adjust means, integrating means coupled to receive the output signals from said proportional gain adjust means, summing means coupled to provide a rudder order signal indicative of the sum of the signals from said integrating means and said limiting means.

9. The adaptive autopilot of claim 8 wherein the heading keeping means further includes feedback means coupled from the output of said rate gain adjust means to said differentiating means, said feedback means including a serially connected capacitor and variable resistor means.

10. The adaptive autopilot of claim 9 wherein the heading change means includes limiting means coupled to receive direct and inverted signals representative of the ship's speed, differentiating and combining means coupled to receive heading error signals and containing adjustable means to add the signals from said differentiating means to the received heading error signal, amplifying means coupled to receive signals from said differentiating and combining means, the gain characteristics of said amplifying means being controlled by the output of said limiting means, gain adjust means for producing a rudder order signal in response to the output of said amplifying means, said gain adjust means being further coupled to receive a signal indicative of the square of the ship's speed and being adjustable to provide a gain proportional to the reciprocal of the square of a ship's speed.

* * * * *